United States Patent
Scandola

(10) Patent No.: US 9,490,719 B2
(45) Date of Patent: Nov. 8, 2016

(54) SYSTEM AND METHOD FOR A POWER CONVERTER

(71) Applicant: Infineon Technologies AG, Neubiberg (DE)

(72) Inventor: Luca Scandola, Verona (IT)

(73) Assignee: Infineon Technologies AG, Neubiberg (DE)

( * ) Notice: Subject to any disclaimer, the term of this patent is extended or adjusted under 35 U.S.C. 154(b) by 292 days.

(21) Appl. No.: 14/133,129

(22) Filed: Dec. 18, 2013

(65) Prior Publication Data

US 2015/0171729 A1    Jun. 18, 2015

(51) Int. Cl.
| | | |
|---|---|---|
| H02M 7/515 | (2007.01) | |
| H02M 3/335 | (2006.01) | |
| H02M 3/158 | (2006.01) | |
| H02M 1/00 | (2006.01) | |

(52) U.S. Cl.
CPC ......... *H02M 3/33569* (2013.01); *H02M 3/158* (2013.01); *H02M 3/1588* (2013.01); *H02M 3/33592* (2013.01); *H02M 2001/0058* (2013.01); *Y02B 70/1466* (2013.01); *Y02B 70/1475* (2013.01); *Y02B 70/1491* (2013.01)

(58) Field of Classification Search
CPC ............. H02M 3/158; H02M 3/1588; H02M 2001/0058; H02M 3/33592
USPC ........................................... 363/21.02–21.18
See application file for complete search history.

(56) References Cited

U.S. PATENT DOCUMENTS

| | | | | |
|---|---|---|---|---|
| 2011/0187189 | A1* | 8/2011 | Moussaoui | H02M 3/158 307/31 |
| 2013/0314951 | A1 | 11/2013 | Harrison | |
| 2014/0266090 | A1* | 9/2014 | Wei | H02M 3/156 323/271 |
| 2014/0369090 | A1* | 12/2014 | Ueki | H02M 1/15 363/41 |

FOREIGN PATENT DOCUMENTS

DE    10143251    3/2003

OTHER PUBLICATIONS

Daneshpajooh, H., et al., "Modified Dual Active Bridge Bidirectional dc-dc Converter with Optimal Efficiency," Applied Power Electronics Conference and Exposition (APEC), IEEE, Feb. 5-9, 2012, pp. 1348-1354.

(Continued)

*Primary Examiner* — Adolf Berhane
*Assistant Examiner* — Afework Demisse
(74) *Attorney, Agent, or Firm* — Slater Matsil, LLP

(57) ABSTRACT

According to an embodiment, a power supply controller includes a first controller, a second controller, a transformation circuit, a switch signal generator. The first controller is configured to provide a first control parameter based on a first power supply measurement signal and the second controller is configured to provide a second control parameter based on a second power supply measurement signal. The transformation circuit is configured to provide a first switching control parameter dependent on both the first control parameter and the second control parameter, and to provide a second switching control parameter dependent on both the first control parameter and the second control parameter. The switch signal generator is configured to generate switching signals that depend on both the first switching control parameter and the second switching control parameter.

28 Claims, 14 Drawing Sheets

(56) References Cited

OTHER PUBLICATIONS

Krismer, F., et al., "Efficiency-Optimized High-Current Dual Active Bridge Converter for Automotive Applications," IEEE Transactions on Industrial Electronics, vol. 59, No. 7, Jul. 2012, pp. 2745-2760.

Almer, et al., "Dynamic Phasor Analysis of Pulse Modulated Systems," 46th IEEE Conference on Decision and Control, ThPI27.17, New Orleans, LA, Dec. 12-14, 2007, 8 pages.

Bai, et al., "Eliminate Reactive Power and Increase System Efficiency of Isolated Bidirectional Dual-Active-Bridge DC-DC Converters Using Novel Dual-Phase-Shift Control," IEEE Transactions on Power Electronics, vol. 23, No. 6, Nov. 2008, 10 pages.

Corradini, et al., "Minimum Current Operation of Bidirectional Dual-Bridge Series Resonant DC/DC Converters," IEEE Transactions on Power Electronics, vol. 27, No. 7, Jul. 2012, 11 pages.

Corradini, et al., "Zero Voltage Switching Technique for Bi-Directional DC/DC Converters," Date of Conference Sep. 17-22, 2011, 24 pages.

Costinett, et al., "Discrete-Time Small Signal Modeling of a 1 MHz Efficiency-Optimized Dual Active Bridge Converter With Varying Load," Colorado Power Electronics Center, Control and Modeling for Power Electronics (COMPEL), 2012 IEEE 13th Workshop, Date of Conference Jun. 10-13, 2012, 7 pages.

Costinett, et al., "Automatic Voltage and Dead Time Control for Efficiency Optimization in a Dual Active Bridge Converter," Colorado Power Electronics Center, Applied Power Electronics Conference and Exposition (APEC), 2012 Twenty-Seventh Annual IEEE, Date of Conference Feb. 5-9, 2012, 8 pages.

Kang, et al., "Efficiency Optimization in Digitally Controlled Flyback DC-DC Converters Over Wide Ranges of Operating Conditions," IEEE Transactions on Power Electronics, vol. 27, No. 8, Aug. 2012, 15 pages.

Li, et al., "Analysis and Design of High-Frequency Isolated Dual-Bridge Series Resonant DC/DC Converter," IEEE Transactions on Power Electronics, vol. 25, No. 4, Apr. 2010, 13 pages.

Oggier, et al., "Switching Control Strategy to Minimize Dual Active Bridge Converter Losses," IEEE Transactions on Power Electronics, vol. 24, No. 7, Jul. 2009, 13 pages.

Oggier, et al., "Extending the ZVS Operating Range of Dual Active Bride High-Power DC-DC Converters," Power Electronics Specialists Conference, 2006, PESC '06, 37th IEEE, Date of Conference Jun. 18-22, 2008, 7 pages.

Parayandeh, et al., "Digitally Controlled Low-Power DC-DC converter with Instantaneous On-Line Efficiency Optimization," Laboratory for Power Management and Integrated SMPS, Date of Conference Feb. 15-19, 2009, 5 pages.

Parayandeh, et al., "Digitally Controlled Low-Power DC-DC Converter with Segmented Output Stage and Gate Based Instantaneous Efficiency Optimization," Laboratory for Power Management and Integrated SMPS, Date of Conference Sep. 20-24, 2009, 6 pages.

Rim, et al., Phasor Transformation and its Applications to the DC/AC Analyses of Frequency Phase-Controlled Series Resonant Converters (SRC), IEEE Transactions on Power Electronics, vol. 5, No. 2, Apr. 1990, 11 pages.

Sanders, et al., "Generalized Averaging Method for Power Conversion Circuits," IEEE Transactions on Power Electronics, vol. 6, No. 2, Apr. 1991, 9 pages.

Seltzer, et al., "Gain-Scheduled Control of Multi Angle Phase Shift Modulated Dual Active Bridge Series Resonant DC/DC Converters," Control and Modeling for Power Electronics (COMPEL), 2012 IEEE, 13th Workshop, Date of Conference Jun. 10-13, 2012, 7 pages.

Seltzer, et al., "Small Signal Phasor Modeling of Dual Active Bridge Series Resonant DC/DC Converters with Multi-Angle Phase Shift Modulation," Electrical, Computer, and Energy Engineering Department, University of Colorado, Boulder, Date of Conference Sep. 17-22, 2011, 8 pages.

Steigerwald, "A Comparison of Half-Bridge Resonant converter Topologies," IEEE Transactions on Power Electronics, vol. 3, No. 2, Apr. 1988, 9 pages.

Trescases, et al., "Predictive Efficiency Optimization for DC-DC Converters with Highly Dynamic Digital Loads," IEEE Transactions on Power Electronics, vol. 23, No. 4, Jul. 2008, 11 pages.

Ye, "Dual Half-Bridge DC/DC Converter with Wide-Range ZVS and Zero Circulating Current," Date of Conference Sep. 20-24, 2009, 6 pages.

Yin, et al., "Direct Modeling of Envelope Dynamics in Resonant Inverters," Date of Conference Jun. 15-19, 2003, 6 pages.

Yousefzadeh, et al., "Sensorless Optimization of Dead Times in DC-DC Converters with Synchronous Rectifiers," Colorado Power Electronics Center, Power Electronics, IEEE Transactions on vol. 21, Issue 4, Jul. 2006, 7 pages.

* cited by examiner

US 9,490,719 B2

SYSTEM AND METHOD FOR A POWER CONVERTER

TECHNICAL FIELD

The present invention relates generally to a system and method for an electronic circuit, and, in particular embodiments, to a system and method for a converter circuit.

BACKGROUND

Converter circuits are pervasive in many electronic applications from computers to automobiles, for example. A common application for voltage and/or converter circuits is in power supply systems. Generally, voltages within a power supply system are generated by performing a DC-DC, DC-AC, and/or AC-DC conversion by operating a switch loaded with an inductor or transformer as a converter circuit. One class of such systems includes switched mode power supplies (SMPS). An SMPS is usually more efficient than other types of power conversion systems because power conversion is performed by controlled charging and discharging of the inductor or transformer and reduces energy lost due to power dissipation across resistive voltage drops.

Switching converter circuits that may be used for an SMPS may include buck converters, boost converters, flyback converters, half bridge converters, and full bridge converters, among others. Both buck and boost converters typically make use of an inductor whereas a flyback converter isolates a load and may multiply the voltage conversion ratio through the use of a transformer. Half bridge converters often use two transistors coupled to an inductor at an intermediate node between the switching transistors and full bridge converters often use four switching transistors. Another type of converter is a dual half bridge series converter, which includes two half bridge converter circuits coupled in series with an energy storage element, such as an inductor, coupled between the two half bridge converters.

In many switched-mode power converters, the timing of the switches is determined by a feedback control system in order to control an output voltage and/or current characteristic of the power supply. For example, a feedback controller may compare a measured output voltage of a power supply with a voltage reference to produce an error signal, and then use the error signal to adjust a duty cycle of a pulse-width modulator circuit that determines switching signals.

SUMMARY OF THE INVENTION

According to an embodiment, a power supply controller includes a first controller, a second controller, a transformation circuit, a switch signal generator. The first controller is configured to provide a first control parameter based on a first power supply measurement signal and the second controller is configured to provide a second control parameter based on a second power supply measurement signal. The transformation circuit is configured to provide a first switching control parameter dependent on both the first control parameter and the second control parameter, and to provide a second switching control parameter dependent on both the first control parameter and the second control parameter. The switch signal generator is configured to generate switching signals that depend on both the first switching control parameter and the second switching control parameter.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
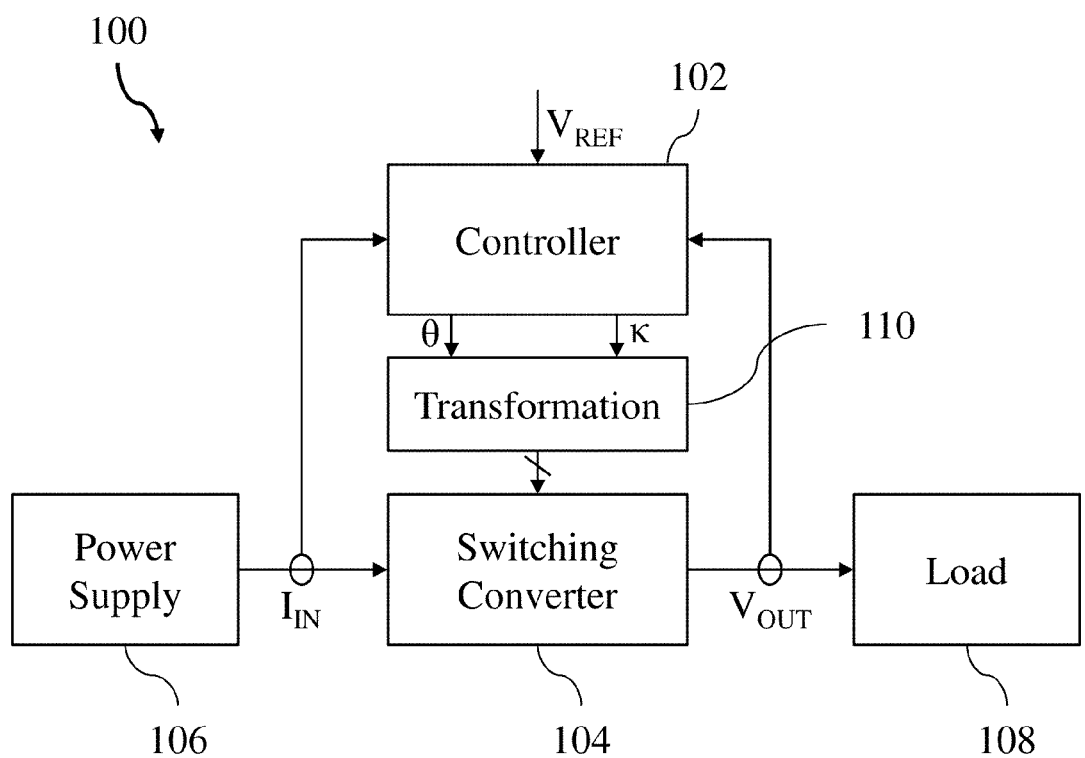
FIG. 1 illustrates a block diagram of an embodiment switching converter circuit.

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Description is made with respect to various embodiments in a specific context, namely electronic converter circuits, and more particularly, DC/DC converter circuits. Some of the various embodiments described herein include control systems, switching converter circuits, power supplies and switching power supplies, regulated DC/DC converters, DC/DC dual half bridge series converters, and control and efficiency optimization methods. In other embodiments, aspects may also be applied to other applications involving any type of converter or switching circuit according to any fashion as known in the art.

A switching converter uses a switching sequence to charge and discharge an inductor at the input side, and to operate a synchronous rectifier on the output side of the converter. In a resonant mode switching converter, a resonant tank is charged and discharged at or about its resonant frequency. In some cases, switching losses may be minimized by operating the switches in a way that minimizes the voltage across the switches and/or in a way that minimizes the current across the switches during operation. This may be accomplished, for example, by determining a switching sequence a-priori that minimizes switching losses, or using a circuit that directly detects or estimates such zero voltage or zero current switching conditions. Thus, by minimizing the amount of power lost across the switch, the overall efficiency of the converter may be increased.

In embodiments of the present invention, a multi-variable control system is used to determine switching signals. For example, in one embodiment, a fast regulation loop is used to control the output voltage, and a slower efficiency optimization loop is used to minimize the average input current of the converter. Within the power converter, the output voltage $V_{OUT}$ and average current $I_{IN}$ are sensed and converted into two intermediate control parameters $\theta$ and $\kappa$. These intermediate control parameters are then transformed by a transformation block into switch control parameters, for example a duty cycle $d_A$ and phase shift $\phi$ between switching legs, that are used by a modulator to operate the switches of the power converter. The transformation from intermediate control parameters $\theta$ and $\kappa$ to switch control parameters $d_A$ and $\phi$ is done such that the switch control parameters are correlated to each other, and the switch control parameters converge to provide efficient operation of the power converter.

In one example, the individual outputs of the voltage controller and the average current controller each affects both the duty cycle $d_A$ and the phase shift $\phi$ between the control signals of the switching legs. This mapping from voltage and current controller outputs to duty cycle and phase shift may be a polar mapping. For example, the output of the voltage controller $\kappa$ may be a first intermediate parameter that defines a vector distance from a maximum power point of the switching parameters and the output of the average current controller $\theta$ may define the slope or angle of the vector. It should be understood, of course, that in alternative embodiments, the switching signals may be parameterized using other parameters besides duty cycle $d_A$ and phase shift $\phi$, the controlled outputs of the power supply may be different from the output voltage and the average input current, and/or the intermediate control variable transformation may be different from a polar transformation with respect to a polar distance from a maximum power point.

FIG. 1 illustrates a block diagram of an embodiment switching converter circuit 100 including controller 102 coupled to switching converter 104, which is coupled between power supply 106 and load 108. Switching converter 104 may be configured to convert input signals from power supply 106 to output signals for load 108, and may receive switching control signals from controller 102 through transformation block 110. In various embodiments, switching converter 104 may be implemented as any type of switching converter. In some embodiments, switching converter 104 is any type of dual active bridge converter, such as a non-resonant dual half bridge converter, for example. In a particular embodiment, switching converter 104 is a dual half bridge series converter.

According to various embodiments, controller 102 measures input current $I_{IN}$ and output voltage $V_{OUT}$ and receives reference voltage $V_{REF}$. In other embodiments, controller 102 may measure any other variables. Controller 102 compares the measured output voltage $V_{OUT}$ to reference voltage $V_{REF}$. In some embodiments, controller 102 functions to minimize the input current and the difference between output voltage $V_{OUT}$ and reference voltage $V_{REF}$.

In a specific embodiment, controller 102 generates an intermediate polar control parameter $\kappa$ that is related to the output power of switching converter 104 and controller 102 generates an intermediate polar control parameter $\theta$ that is related to efficiency of switching converter 104. The polar control parameters $\kappa$ and $\theta$ are a magnitude and angle, respectively, in a polar control plane centered at the maximum power point of switching converter 104, as described in detail below. Transformation block 110 transforms polar control parameters $\kappa$ and $\theta$ into physical switching parameters that form the coordinates of the Cartesian control plane. For example, polar control parameters $\kappa$ and $\theta$ are transformed into duty cycle $d_A$ and phase shift $\phi$ for switching control signals supplied to switching converter 104. In alternative embodiments, other variables may be used.

Figure 2:
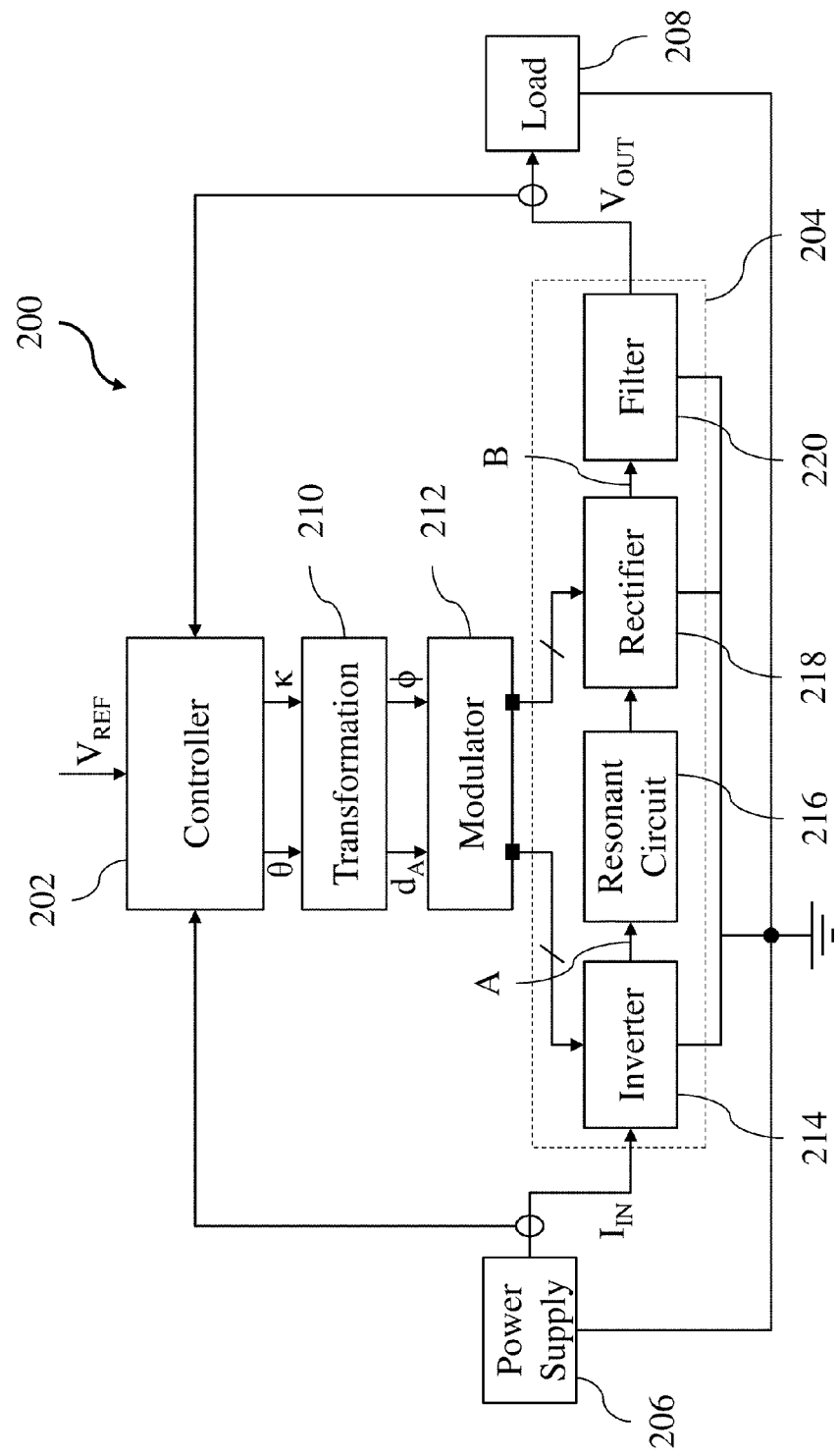
FIG. 2 illustrates a more detailed block diagram of an embodiment switching converter circuit.

FIG. 2 illustrates a more detailed block diagram of an embodiment switching converter circuit 200 including controller 202, power supply 206, load 208, and switching converter 204. According to various embodiments, controller 202 monitors an input current $I_{IN}$ and an output voltage $V_{OUT}$ as shown. Switching converter 204 includes inverter 214, resonant circuit 216, rectifier 218, and filter 220. Inverter 214 may include top side and bottom side switches that function to receive input current $I_{IN}$ and alternatingly charge resonant circuit 216 with input current $I_{IN}$. In some embodiments, switching of inverter 214 is performed at or near a resonant frequency of resonant circuit 216. Rectifier 218 receives power from resonant circuit 216 and alternatingly transfers power through filter 220 to load 208. Rectifier 218 may also include top side and bottom side switches. In various embodiments, inverter 214 is a first leg and rectifier 218 is a second leg of a dual half bridge switching series converter. In alternative embodiments, resonant circuit 216 may be any type of energy storage element for a switching circuit and is not necessarily a resonant circuit.

As shown, inverter 214 and rectifier 218 receive switching control signals from modulator 212, which is coupled to controller 202 via transformation block 210. In some embodiments, controller 202 includes two functional blocks: (1) a fast output voltage regulation block and (2) a slow input current minimization block. In such an embodiment, controller 202 monitors the output voltage $V_{OUT}$ and quickly responds by modifying a control signal, such as intermediate polar control parameter $\kappa$, if the output voltage $V_{OUT}$ differs from a target or reference voltage. Controller 202 also monitors the input current $I_{IN}$ and more slowly responds by modifying a control signal, such as intermediate polar control parameter $\theta$, in order to minimize the input current $I_{IN}$. In one particular embodiment, if the switching converter 204 is operated at a switching frequency of $f_S$ with a corresponding period of $T_S=1/f_S$, then controller 202 may update intermediate polar control parameter $\kappa$ every cycle, i.e. every $T_S$. Similarly, controller 202 may update intermediate polar control parameter $\theta$ every third cycle, i.e. every $3 \cdot T_S$. Any relationship for controller regulation may be used depending on the system.

In various embodiments, intermediate control parameters $\theta$ and $\kappa$ are supplied to transformation block 210, which transforms the intermediate control parameters into physical switching parameters such as a duty cycle $d_A$ of the first leg, a duty cycle $d_B$ of the second leg, and/or a phase shift $\phi$ between the switching signals of the first and second legs.

Figure 3:
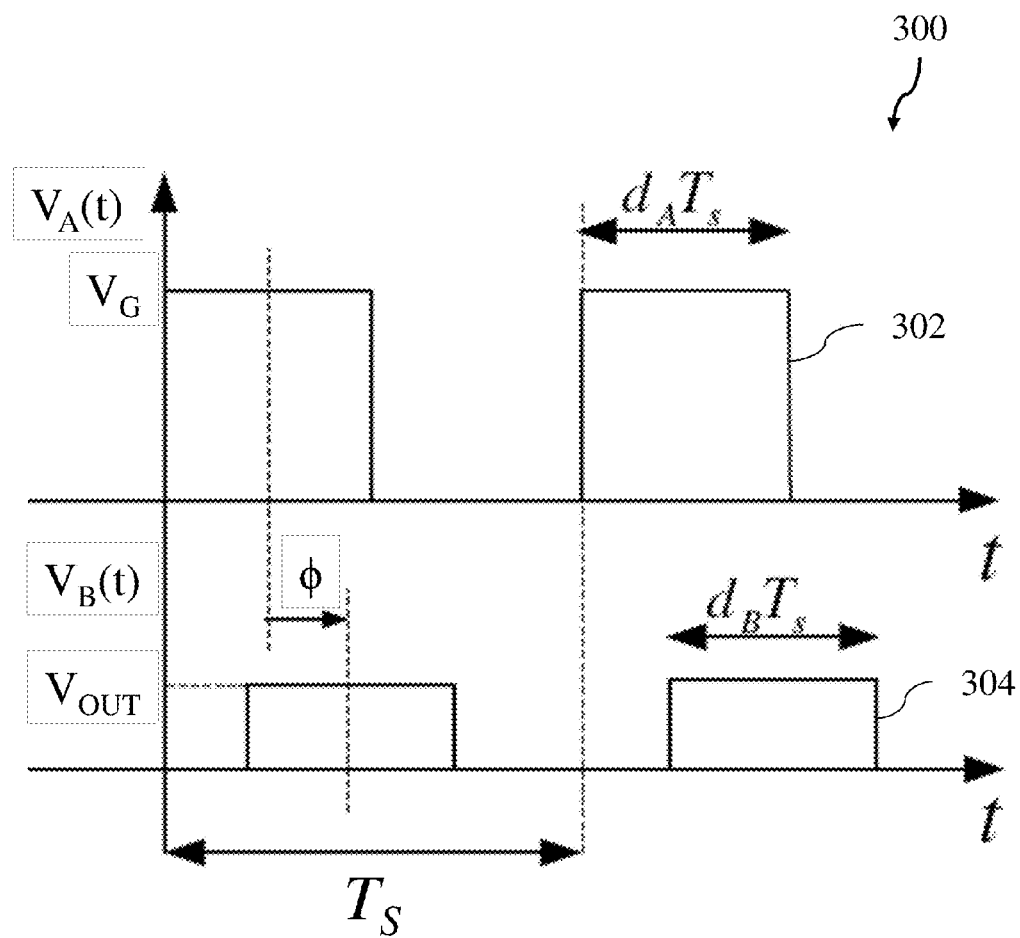
FIG. 3 illustrates a waveform diagram of embodiment switching signals.

FIG. 3 illustrates a waveform diagram 300 of embodiment switching signals $V_A(t)$ and $V_B(t)$, which correspond to voltages at nodes A and B in FIG. 2. Switching signals $V_A(t)$ and $V_B(t)$ are used to illustrate the physical switching parameters $d_A$, $d_B$, and $\phi$. Waveform 302 shows the voltage $V_A(t)$ at node A during switching. As inverter 214 is switched, a power supply voltage $V_G$ and a reference voltage, shown as zero volts, are alternatingly connected to node A causing the voltage $V_A(t)$ to follow the switching signal and alternate between $V_G$ and zero volts. As shown, the period of switching is $T_S$ and the duty cycle of the first leg, which corresponds to inverter 214 in some embodiments, is $d_A$.

Similarly, waveform 304 shows the voltage $V_B(t)$ at node B during switching. As rectifier 218 is switched, an output voltage $V_{OUT}$ and the reference voltage, shown as zero volts, are alternatingly connected to node B causing the voltage $V_B(t)$ to follow the switching signal and alternate between $V_{OUT}$ and zero volts. In this embodiment, the period of switching $T_S$ is the same as for the first leg and the duty cycle of the second leg, which corresponds to rectifier 218 in some embodiments, is $d_B$. Also shown is phase shift $\phi$, which corresponds to the phase shift or offset between switching cycles of the first and second switching legs. Thus, in the present embodiment, phase shift $\phi$ corresponds to the phase difference between inverter 214 and rectifier 218.

According to various embodiments, switching period $T_S$, duty cycles $d_A$ and $d_B$, and phase shift $\phi$ may take on any value according to controller 202 and transformation block 210. In some embodiments, the duty cycle $d_B$ of the second leg is left constant while the duty cycle $d_A$ of the first leg is varied. In other embodiments, duty cycle $d_B$ may be varied and duty cycle $d_A$ may be left constant, or both duty cycles may be varied in other embodiments. As shown in FIG. 2, transformation block 210 transforms $\kappa$ into a modified duty cycle $d_A$ for the first leg and a modified phase shift $\phi$ and also transforms $\theta$ into a modified duty cycle $d_A$ for the first leg and a modified phase shift $\phi$ based on the outputs of controller 202. In this way, each intermediate polar control parameter affects both the duty cycle $d_A$ and the phase shift $\phi$. In such embodiments, modulator 212 uses the new values for duty cycle $d_A$ and the phase shift $\phi$ to generate switching signals for inverter 214 and rectifier 218 in switching converter 204.

Figure 4:
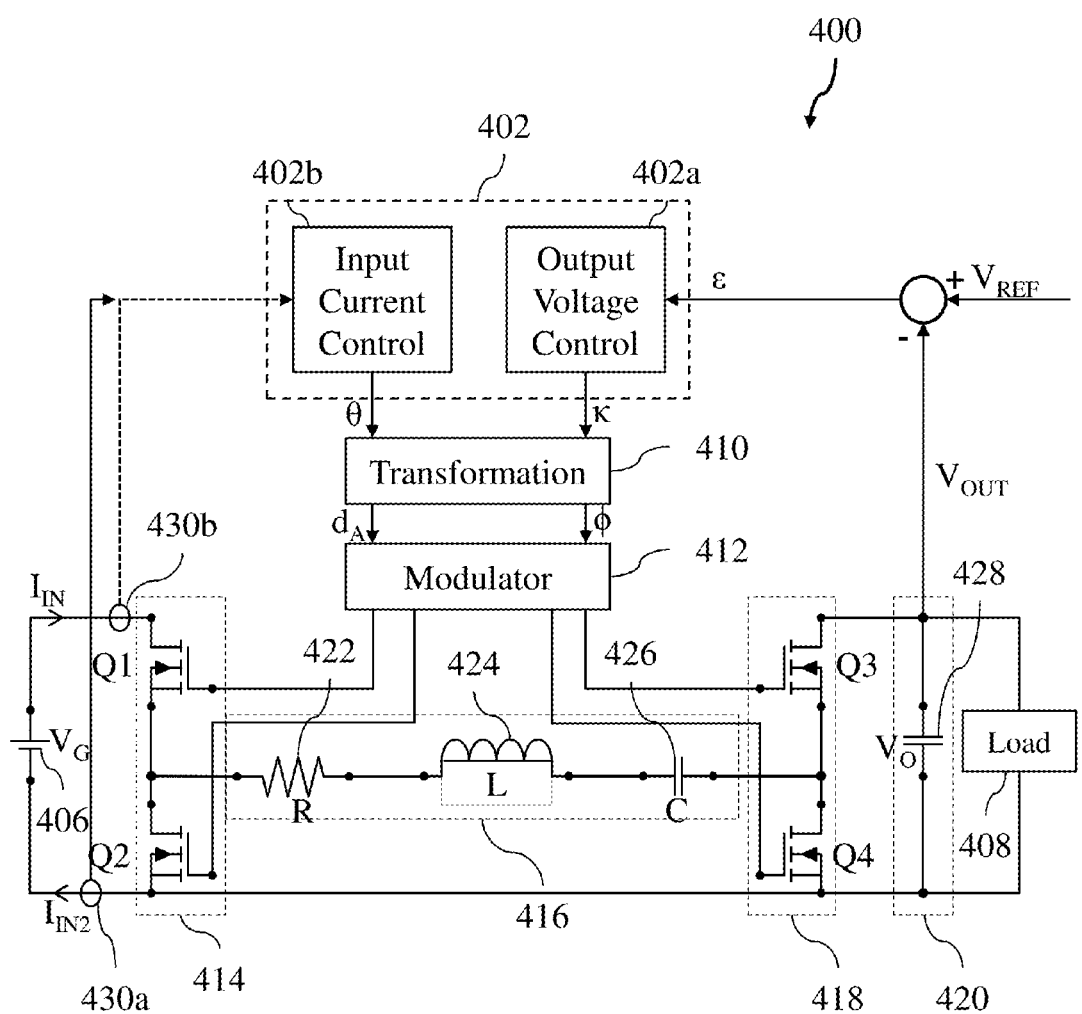
FIG. 4 illustrates a schematic diagram of an embodiment switching converter circuit.

FIG. 4 illustrates a schematic diagram of an embodiment switching converter circuit 400 including control circuit 402, power supply 406, load 408, transformation block 410, modulator 412, inverter 414, resonant circuit 416, rectifier 418, and filter 420. Controller 402 includes an output voltage control 402a that receives a feedback signal $\epsilon$ corresponding to a difference between a reference voltage $V_{REF}$ and an output voltage $V_{OUT}$ that is supplied to load 408. Based on feedback signal $\epsilon$, output voltage control 402a may generate intermediate polar control parameter $\kappa$, which may correspond to a vector magnitude from the maximum power point in a control plane. In other embodiments, feedback signal $\epsilon$ may correspond to any signal in switching converter circuit.

According to various embodiments, controller 402 may also include input current control 402b that measures input current $I_{IN}$ though measurement circuit 430b. In some embodiments, input current control 402b may measure another circuit signal, such as return current $I_{IN2}$ through measurement circuit 430a. Measurement circuits 430a or 430b may include a series resistor and voltage measurements, for example, or any other type of current measurement as is known in the art. Based on input current $I_{IN}$ or return current $I_{IN2}$, input current control 402b may generate intermediate polar control parameter $\theta$, which may correspond to a slope or angle in the control plane. In various embodiments, input current control 402b performs a minimization algorithm, such as a perturb and observe algorithm, in which input current $I_{IN}$ is reduced or minimized. In some embodiments, input current control 402b operates and regulates input current $I_{IN}$ more slowly than output voltage control 402a operates and regulates output voltage $V_{OUT}$. As similarly described in reference to FIG. 2, in some embodiments input current control 402b updates intermediate polar control parameter $\theta$ once every three switching cycles and output voltage control 402a updates intermediate polar control parameter $\kappa$ once every switching cycle. Intermediate polar control parameter $\theta$ and $\kappa$ are updated more or less frequently in various embodiments. In other embodiments, input current control 402b and output voltage control 402a operate at a same speed.

According to various embodiments, transformation block 410 transforms intermediate polar control parameters $\kappa$ and $\theta$ into physical control parameters, such as duty cycle $d_A$ of the first leg and phase shift $\phi$ for example. Modulator 412 uses the physical control parameters to generate new switching signals for switches Q1, Q2, Q3, and Q4 included in inverter 414 and rectifier 418. In various embodiments, switches Q1-Q4 may be MOSFETs, as shown. In other embodiments, switches Q1-Q4 may include BJTs, JFETs, or other types of switching transistors or electronic switching circuits.

In various embodiments, switches Q1 and Q2 are operated to have a duty cycle $d_A$, switches Q3 and Q4 are operated to have a duty cycle $d_B$, and the switching cycle of switches Q1 and Q2 may be offset from the switching cycle of switches Q3 and Q4 by phase shift $\phi$, as described in FIG. 3. When switch Q1 is conducting, Q2 may be non-conducting such that energy is transferred to resonant circuit 416. Within resonant circuit 416, inductor 424 and capacitor 426 store and release energy (charge and discharge). Resistor 422 represents a parasitic resistance. An input capacitor (not shown) may also be included in parallel with power supply 406.

According to various embodiments, energy is transferred from resonant circuit 416 into load 408 and output capacitor 428, which is an implementation of filter 420, when switch Q3 is conducting and switch Q4 is non-conducting. It should be appreciated that while switching converter circuit 400 is implemented as a dual half bridge series resonant converter, alternative embodiments may be directed toward other switching converter architectures. For example, embodiment power converters may be implemented as various types of dual active bridge converters and are not specifically limited to a series resonant converter as shown in FIG. 4.

As described above, intermediate polar control parameters $\theta$ and $\kappa$ are each independently generated by input current control 402b and output voltage control 402a, respectively. Further, these intermediate polar control parameters each affect both the duty cycle $d_A$ and the phase shift $\phi$ due to a transformation implemented in transformation block 410. The behavior of these intermediate polar control parameters are described below in reference to FIGS. 5 and 6.

Figure 5A:
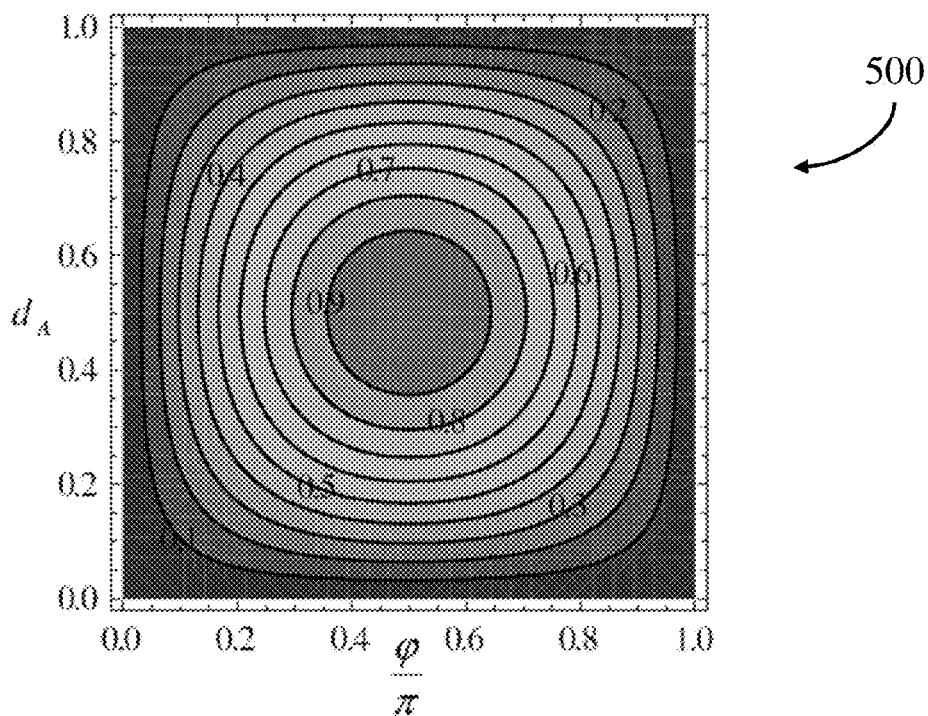
FIGS. 5a and 5b illustrate control planes of an embodiment switching converter circuit showing output power in FIG. 5a and efficiency in FIG. 5b.
Figure 5B:
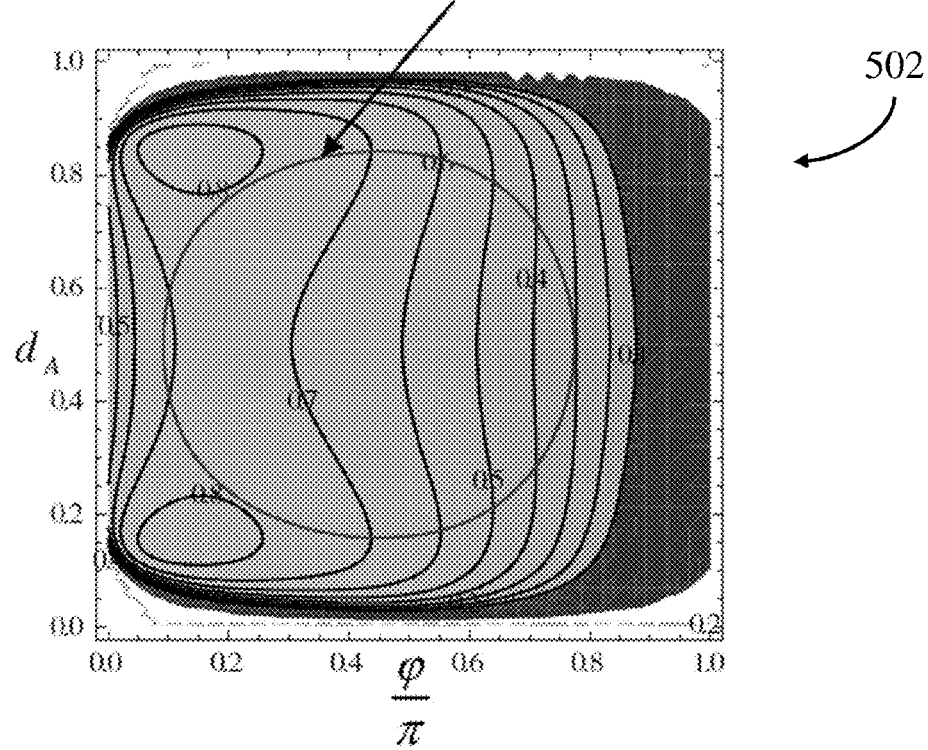

FIGS. 5a and 5b illustrate control planes of an embodiment switching converter circuit showing output power in FIG. 5a and efficiency in FIG. 5b. According to various embodiments, output power plot 500 shows the normalized output power of a switching converter circuit, such as switching converter circuit 400 for example. The normalized output power is plotted as a function of duty cycle $d_A$ of the first leg and phase shift $\phi$ (over $\pi$ to simplify axis). A maximum power point is at the center of plot 500 and corresponds to a normalized output power of 1. The concentric curves are labeled according to normalized output power from 0.1 to 0.9 of the maximum output power. In such embodiments, as duty cycle $d_A$ and phase shift $\phi$ are varied, the normalized output power is shifted. From a control perspective, increasing the output power increases the current supplied to the load and decreasing the output power decreases the current supplied to the load. In other embodiments, the output power is altered by increasing or decreasing the voltage supplied to the load.

In various embodiments, efficiency plot 502 shows the efficiency of the switching converter circuit. Similar to output power plot 500, the efficiency is plotted as a function of duty cycle $d_A$ and phase shift $\phi$. An output power curve corresponding to an output power of 40% is overlaid on the efficiency curve as an example. Depending on how the duty cycle $d_A$ and phase shift $\phi$ are varied, the same 40% output power corresponds to different efficiencies. As the 40% curve is traversed, the switching converter circuit efficiency varies from about 0.3 to about 0.8. This plot is illustrative and not meant to be limiting. In other embodiments, the efficiency may take on any value according to the specific switching converter circuit used. Further, the physical control parameters duty cycle $d_A$ and phase shift $\phi$ may be replaced by other physical control parameters such as duty cycle $d_B$ and switching period $T_S$, for example, as discussed above.

Figure 6A:
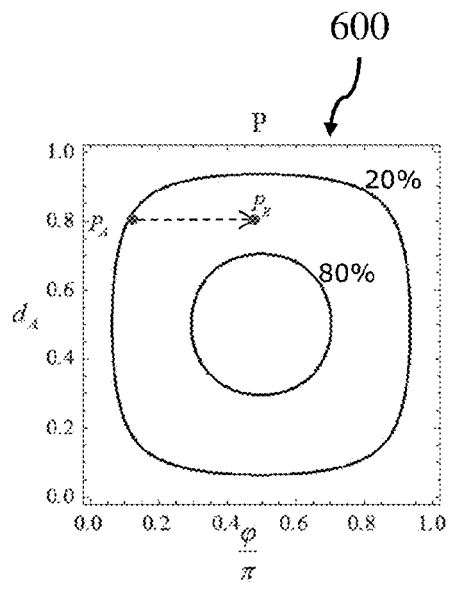
FIGS. 6a-6d illustrate further control planes of embodiment switching converter circuits.
Figure 6B:
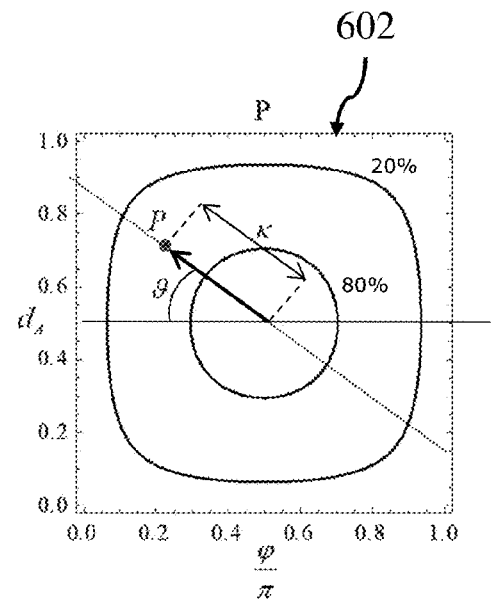

FIGS. 6a-6b illustrate further control planes of embodiment switching converter circuits including output power plots 600, 602, 604, and 606. FIG. 6a illustrates output power plot 600 including an example of a non-interacting control method. If a controller, such as output voltage control 402a in FIG. 4, is configured to modify only a single physical parameter, which in this case is shown as phase shift $\phi$, the output power may not be able to reach a target level. This is shown in output power plot 600 by the transition from $P_A$ to $P_B$. In such an embodiment, the target output power is 80%, for example. The controller alters phase shift $\phi$ in an effort to move from an output power of 20% to 80%. However, in this instance, the control method is unable to achieve the stable output solution of 80% based only on altering the phase shift $\phi$. As an example, the controller may attempt to change the output power in response to a change in current demand or usage at the load.

According to another embodiment, FIG. 6b illustrates output power plot 602 including an example of an interacting control method. In this embodiment, the control plane is traversed with intermediate polar control parameters of angle $\theta$ (or slope) and magnitude $\kappa$ (vector distance). As shown, magnitude $\kappa$ is plotted from the maximum power point of 1, as discussed above, and angle $\theta$ is plotted from a horizontal line crossing through the maximum power point.

Figure 6C:
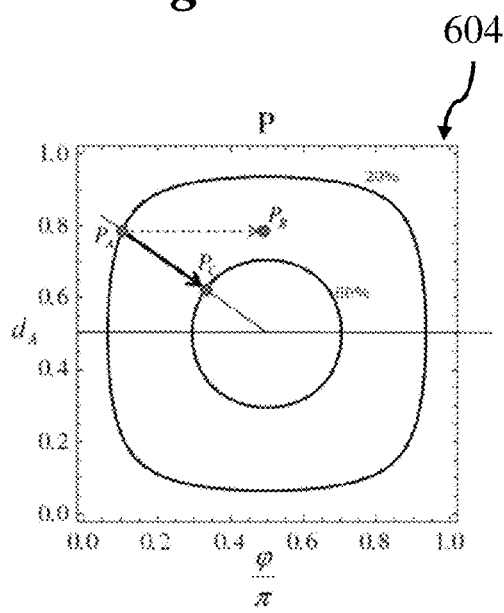

FIG. 6c illustrates output power plot 604 including the same transition from 20% to 80% output power as discussed in reference to FIG. 6a, now showing an interacting control method as discussed in reference to FIG. 6b. The dotted arrow from $P_A$ to $P_B$ shows how the controller is unable to reach the 80% output power curve by changing only the phase shift $\phi$ (non-interacting). The solid arrow from $P_A$ to $P_C$ shows how the controller moves from the 20% to the 80% output power curve by changing the polar magnitude $\kappa$, which maps to a modification of both phase shift $\phi$ and duty cycle $d_A$.

Figure 6D:
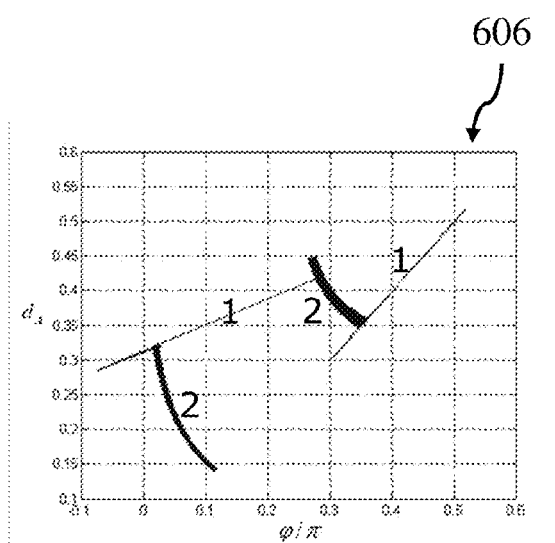

FIG. 6d illustrates output power plot 606 showing changes to both intermediate polar control parameters angle $\theta$ and magnitude $\kappa$. In various embodiments, a controller monitors two signals, such as input current $I_{IN}$ and output voltage $V_{OUT}$ in FIG. 4, using two control blocks, such as input current control 402b and output voltage control 402a. In such an embodiment, output voltage control 402a controls the magnitude $\kappa$ and input current control 402b controls the angle $\theta$. Thus, segments labeled 1 in output power plot 606 indicate modifications to magnitude $\kappa$ by output voltage control 402a in response to changing load voltage conditions. Segments labeled 2 in output power plot 606 indicate modifications to angle $\theta$ by input current control 402b according to an efficiency increasing algorithm. In such embodiments, output voltage control 402a alters magnitude $\kappa$ according to any type of feedback signal based on a circuit variable as is known in the art and input current control 402b alters angle $\theta$ according to any relevant algorithm in order to maximize efficiency. An example algorithm based on minimizing input current is a perturb and observe algorithm that is described below.

Figure 7:
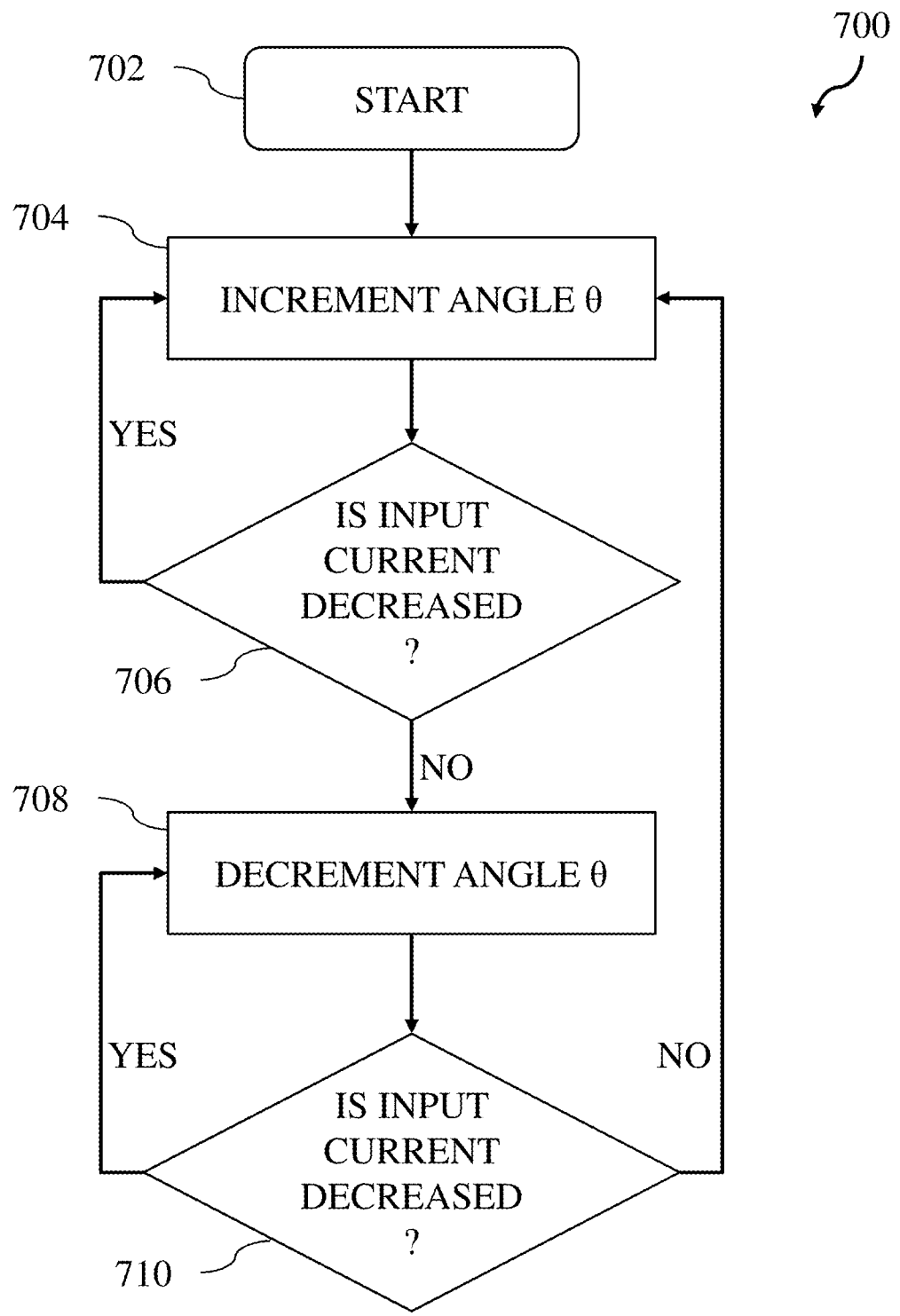
FIG. 7 illustrates a flowchart diagram of an embodiment method of operation for a switching converter circuit.

FIG. 7 illustrates a flowchart diagram of an embodiment method of operation 700 for a switching converter circuit including steps 702-710. Method of operation 700 depicts a perturb and observe algorithm implemented by a controller for reducing and/or minimizing the input current of a switching converter circuit. Step 702 is a start of the algorithm. After starting, step 704 includes incrementing the angle $\theta$ on the control plane as described above with reference to the other figures. After incrementing the angle $\theta$, the input current may be measured again and step 706 includes checking if the input current has decreased since incrementing the angle $\theta$. If the input current is not decreased, step 708 follows step 706. If the input current is decreased, step 704 is repeated. Step 708 includes decrementing the angle $\theta$. After decrementing the angle $\theta$, the input current may be measured again and step 710 includes checking if the input current has decreased since decrementing the angle $\theta$. If the input current is not decreased, step 704 follows step 710. If the input current is decreased, step 708 is repeated. In such embodiments, the angle $\theta$, which may change both duty cycle $d_A$ and phase shift $\phi$, is repeatedly modified towards decreasing input current. Thus, the input current is reduced and or minimized.

In some embodiments, method of operation 700 corresponds to the method of operation used by input current control 402b in FIG. 4 to minimize the input current $I_{IN}$. In other embodiments, method of operation 700 could be used to minimize other variables. In further embodiments, other algorithms could be used to increase and/or maximize the efficiency of a switching converter circuit according to embodiments described herein.

Figure 8:
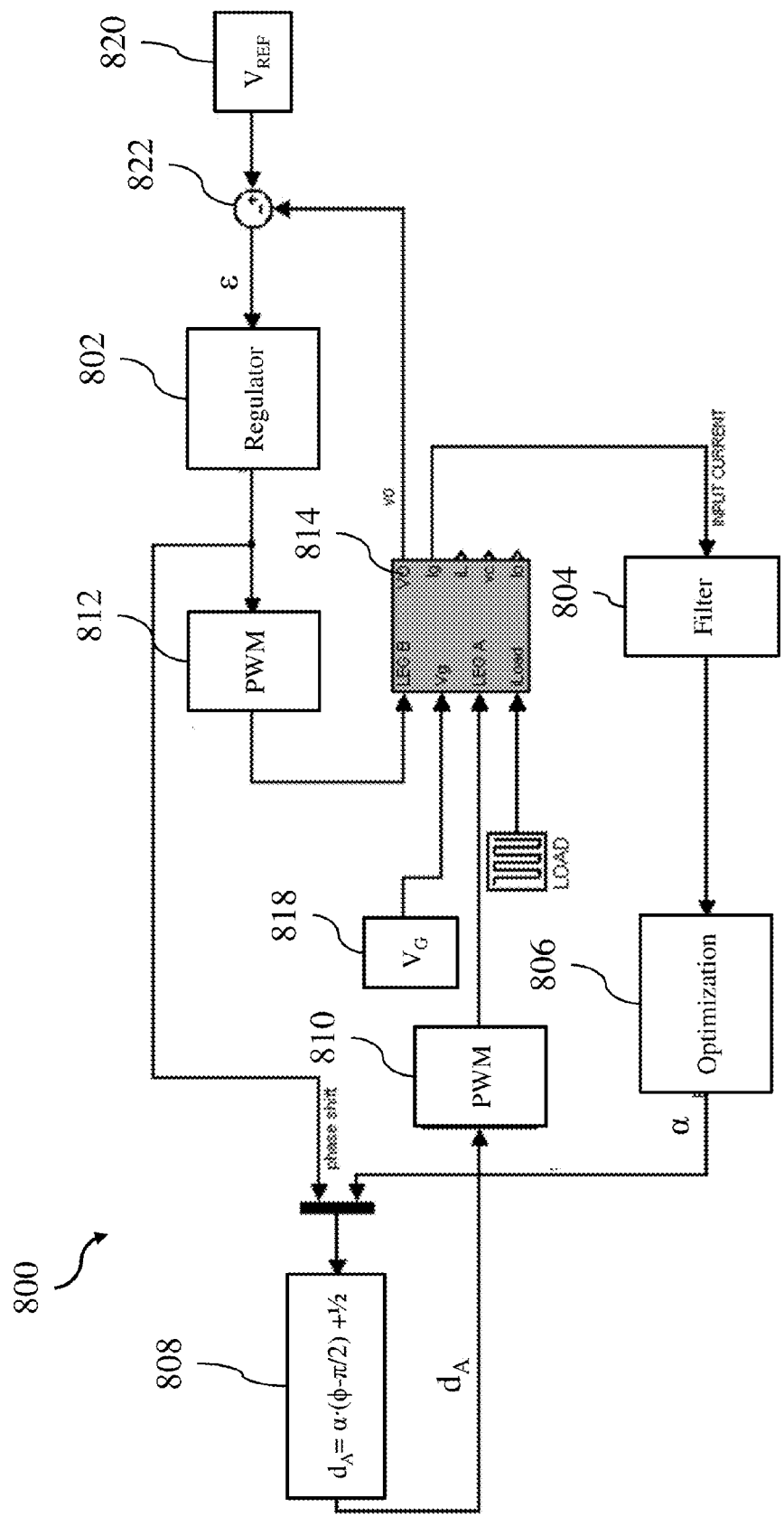
FIG. 8 illustrates a block diagram of a specific embodiment controller for a switching converter circuit.

FIG. 8 illustrates a block diagram of a specific embodiment controller 800 for a switching converter circuit including regulator 802, filter 804, optimization block 806, and function block 808. According to various embodiments, controller 800 depicts a controller model for describing and predicting system performance. Regulator 802 is a fast output voltage regulator that monitors an error signal $\epsilon$ and generates new control signals for switching control in order to regulate the output voltage. Optimization block 806 is a slow optimization loop that monitors the input current and generates new control signals for switching control in order to minimize the input current. Function block 808 is part of both output voltage regulation and input current minimization. Pulse width modulators (PWM) 810 and 812 are coupled to function block 808 and regulator 802, respectively, and generate switching signals based on received physical control signals, such as duty cycle $d_A$ and phase shift $\phi$ as described hereinabove. Circuit model 814 represents a switching converter circuit that receives switching control signals from PWM 810 and 812, a supply voltage $V_G$ from supply 818, and a load current from load 816. Circuit model 814 also supplies signals for output voltage $V_O$ and input current $I_G$. Filter 804 filters instability and transient spikes out of input current $I_G$ before supplying the input current $I_G$ to optimization block 806.

In various embodiments, regulator 802 is a proportional-integral controller that receives error signal $\epsilon$ and outputs phase shift $\phi$. Error signal $\epsilon$ is generated by adder 822 as the difference between reference voltage $V_{REF}$, supplied by reference block 820, and output voltage $V_O$. Optimization block 806 may be implemented according to a perturb and observe algorithm as described in reference to FIG. 7 and outputs a slope $\alpha$. In some embodiments, the slope $\alpha$ is implemented as polar angle $\theta$. Function block 808 receives slope $\alpha$ and phase shift $\phi$ and produces duty cycle $d_A$ according to the function: $d_A(\phi)=\alpha \cdot (\phi-\pi/2)+\frac{1}{2}$, as shown. In some embodiments, the function $d_A(\phi)$ is the function of a straight line through the maximum power point. In other embodiments, function block 808 may be implemented according to other control schemes. The specific layout of blocks and functions in controller 800 is illustrative and numerous combinations and reorganizations of such blocks are envisioned according to embodiments described herein. In the embodiment shown, duty cycle $d_B$ is constant and the value is contained in or supplied to PWM 812 (value is not shown); however, in other embodiments, duty cycle $d_B$ may be incorporated in function block 808 and may be modified by the various blocks in controller 800.

Figure 9A:
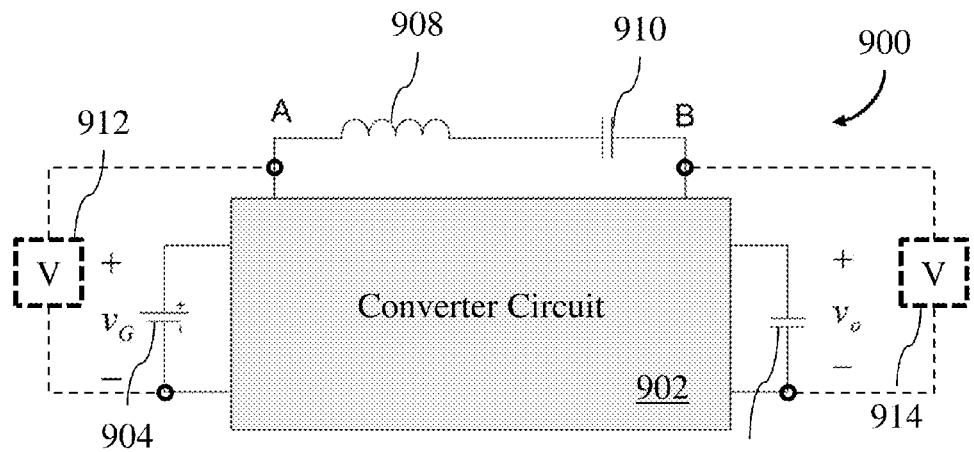
FIGS. 9a-9c illustrate schematic diagrams of embodiment implementation systems.
Figure 9B:
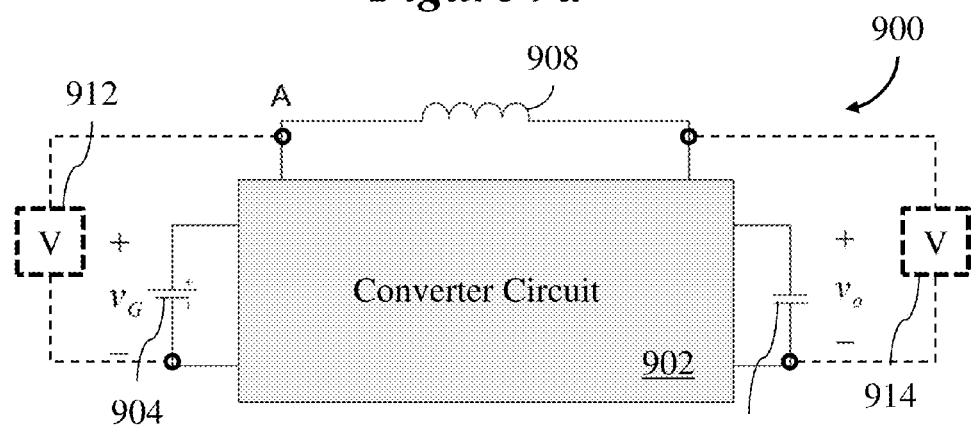
Figure 9C:
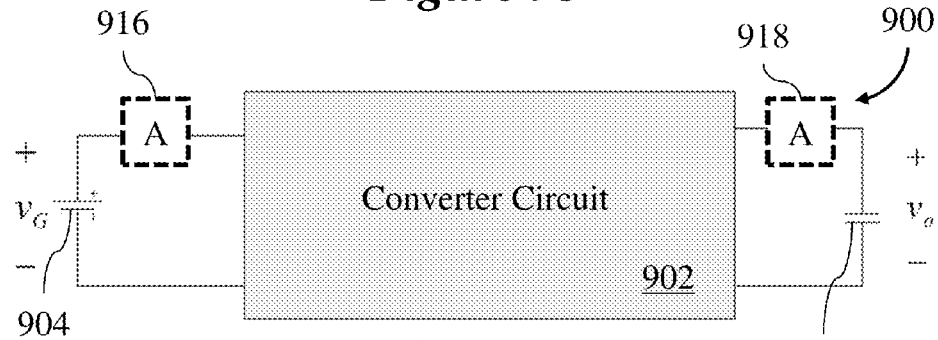

FIGS. 9a-9c illustrate schematic diagrams of embodiment implementation systems including switching converter circuit 902 coupled between supply 904 with supply voltage $V_G$ and load 906 with load voltage $V_O$. Load 906 is depicted as a capacitor. In various embodiments, capacitor 906 may be coupled as a filter in parallel with another load. Converter circuit 902 converts supply voltage $V_G$ to output voltage $V_O$ as described herein in reference to the other figures. Specifically, converter circuit 902 may be implemented similarly to switching converter circuits 100, 200, or 400, for example.

According to various embodiments, converter circuit 902 may have various external or discrete components attached to an integrated circuit (IC), package, or device. FIG. 9a depicts converter circuit 902 coupled to external inductor 908 and capacitor 910. FIG. 9b depicts converter circuit 902 coupled to external capacitor 910. FIG. 9c depicts converter circuit 902 without any external components. FIGS. 9a-9c illustrate that the capacitor 910 and inductor 908, which may form resonant circuits 216 or 316, for example, may be included on chip or off chip to the rest of a switching converter circuit. The various components of switching converter circuits described herein may be implemented as a fully integrated circuit or with discrete components that may include field programmable gate arrays (FPGAs), microcontrollers, or custom application specific integrated circuits (ASICs) coupled to integrated to the discrete resonant components.

In various embodiments, voltage measurement blocks 912 and 914 indicate measurement positions for voltage signals in a switching converter circuit according to various embodiments. Likewise current measurement blocks 916 and 918 indicate measurement positions for current signals in a switching converter circuit according to various embodiments.

Figure 10:
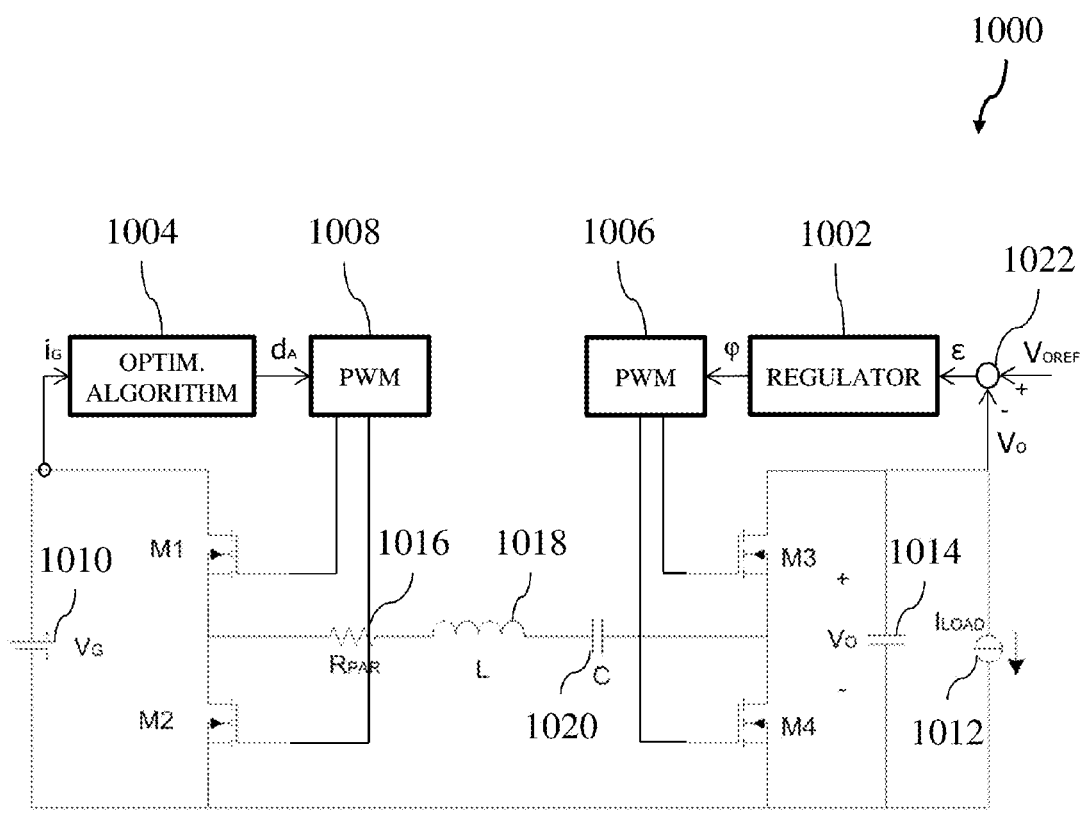
FIG. 10 illustrates a schematic diagram of an alternative embodiment switching converter circuit.

FIG. 10 illustrates a schematic diagram of an alternative embodiment switching converter circuit 1000 including switches M1-M4, PWM 1006 and 1008, regulator 1002, optimization block 1004, voltage supply 1010, and load 1012. According to various embodiments, switches M1-M4 operate as discussed above in reference to switches Q1-Q4 in order to transfer charge from voltage supply 1010 through resistor 1016, inductor 1018, and capacitor 1020 to load 1012 and capacitive filter 1014. PWM 1008 supplies the switching signals for controlling switches M1 and M2 and PWM 1006 supplies the switching signals for controlling switches M3 and M4. Regulator 1002 receives a feedback signal $\epsilon$ from adder 1022 and outputs a phase shift signal $\phi$ to PWM 1006. Optimization block 1004 receives a current measure $i_G$ from voltage supply 1010 and outputs a duty cycle $d_A$ to PWM 1008. Switching converter circuit 1000 illustrates an example of non-interacting control that maintains optimization block 1004 separate from regulator 1002. In other embodiments, regulator 1002 and optimization block 1004 may be coupled together in order to communicate control signals.

Figure 11:
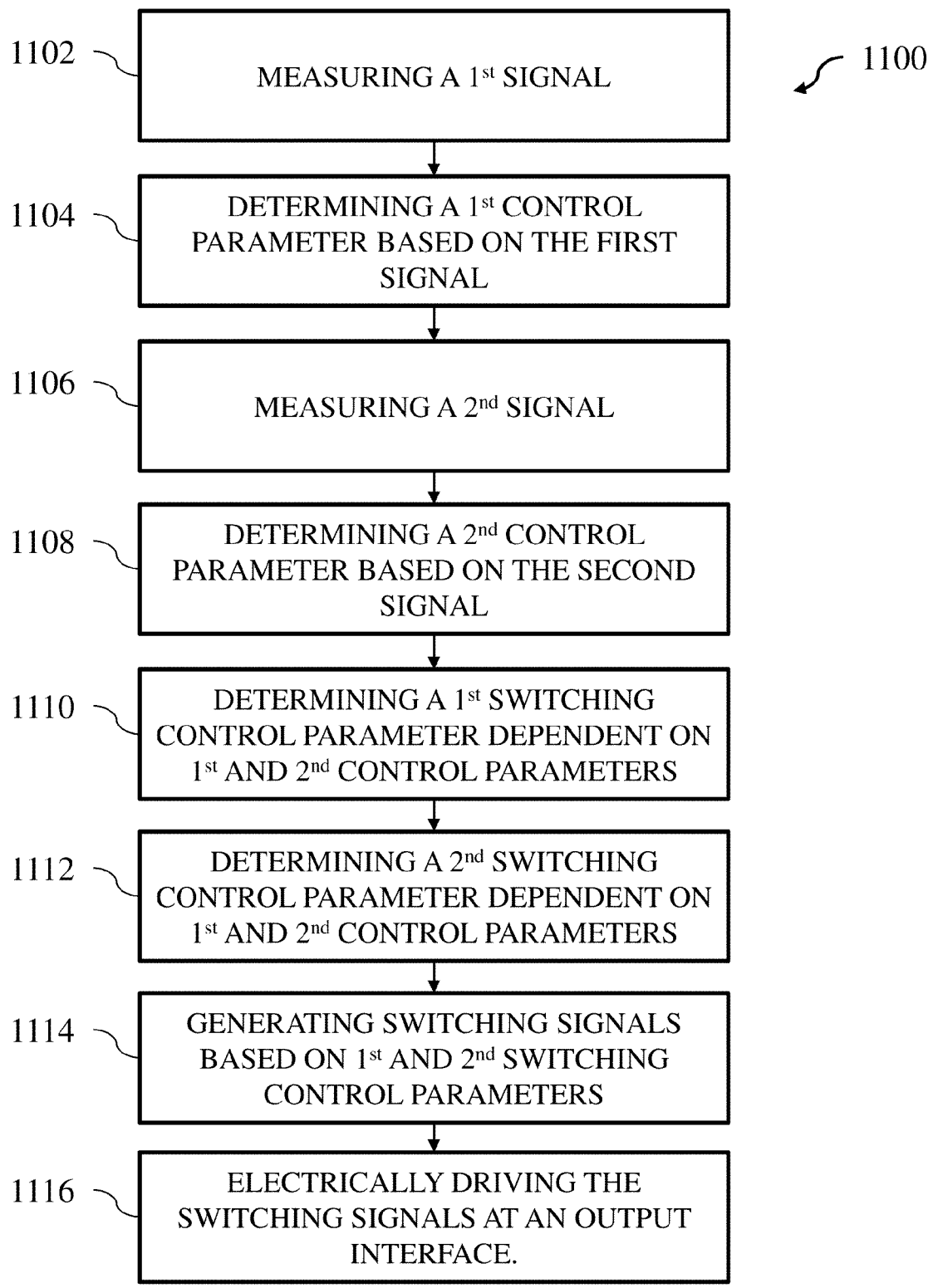
FIG. 11 illustrates a block diagram of embodiment method of operation.

FIG. 11 illustrates a block diagram of embodiment method of operation 1100 for a switched-mode power supply including steps 1102-1116. According to various embodiments, step 1102 includes measuring a first electrical power supply signal of the switched-mode power supply. Following step 1102, step 1104 includes determining a first control parameter based on the first electrical power supply signal measured in step 1102. Step 1106 includes measuring a second electrical power supply signal of the switched-mode power supply. Step 1108 includes determining a second control parameter based on the second electrical power supply signal measured in step 1106. In some embodiments, steps 1106 and 1108 are repeated less frequently than steps 1102 and 1104. In various embodiments, method 1100 may be repeated every switching cycle, less often than every cycle, or multiple times per cycle. Similarly, steps 1102 and 1104 may be performed at a rate independent of or different from steps 1106 and 1108. After step 1108, step 1110 includes determining a first switching control parameter that is dependent on both the first control parameter and the second control parameter. Similarly, step 1112 includes determining a second switching control parameter that is also dependent on both the first control parameter and the second control parameter. Based on steps 1110 and 1112, step 1114 includes generating switching signals based on the first switching control parameter and the second switching control parameter. Step 1116 includes electrically driving the generated switching signals at an output interface. According to various embodiments, steps 1102 and 1116 may be performed in many different orders or concurrently. In some embodiments, steps 1104, 1108, 1110, and 1112 may be performed at different speeds. For example, step 1104 may be performed more quickly than step 1108 in some embodiments, or vice versa.

Figure 12:
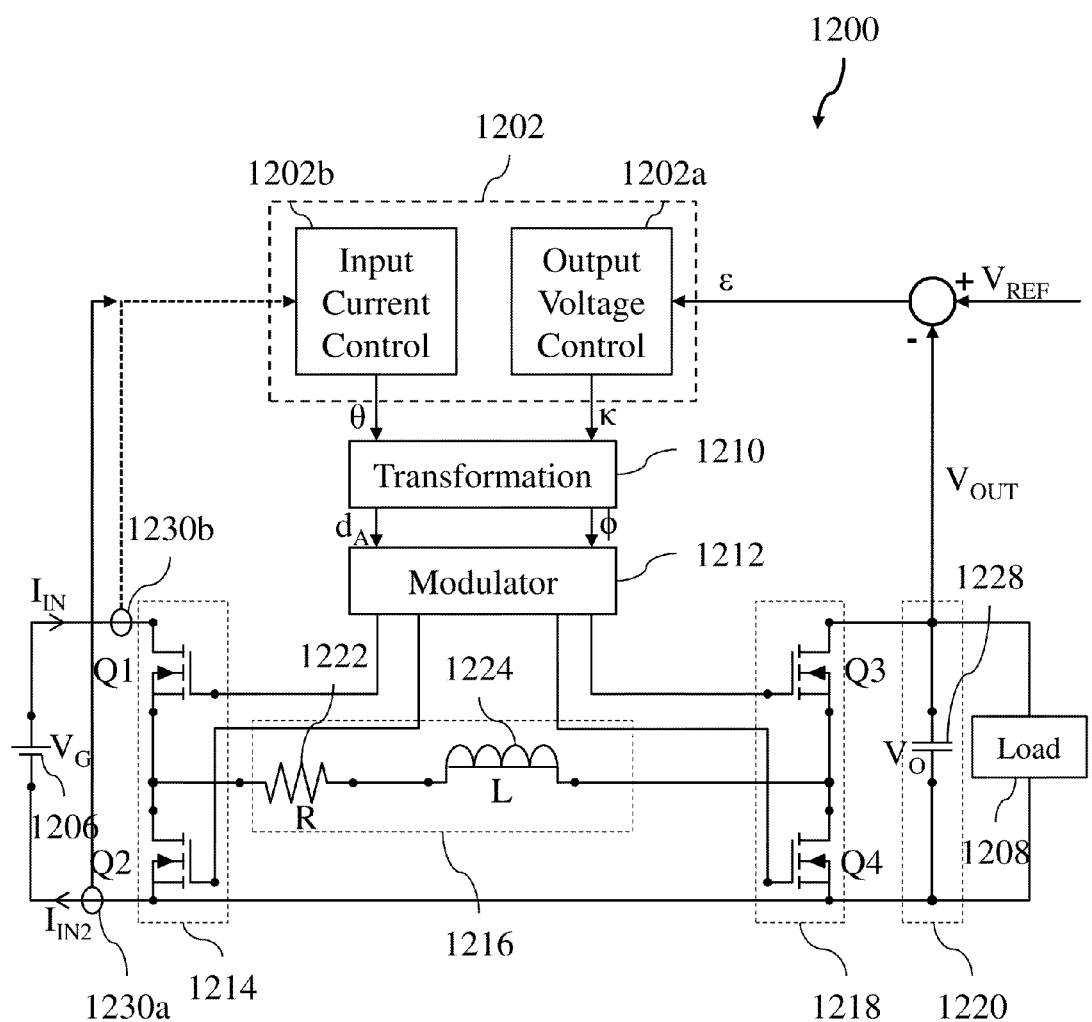
FIG. 12 illustrates a schematic diagram of another embodiment switching converter circuit.

FIG. 12 illustrates a schematic diagram of another embodiment switching converter circuit 1200 that includes the elements as described in reference to switching converter circuit 400 in FIG. 4, but includes only inductor 1224 and resistor 1222 instead of resonant circuit 416. Thus, switching converter circuit 1200 is an example of a non-resonant dual half bridge converter. All the elements in switching converter 1200 operate in a similar manner or the same as described above with reference to FIG. 4.

Figure 13:
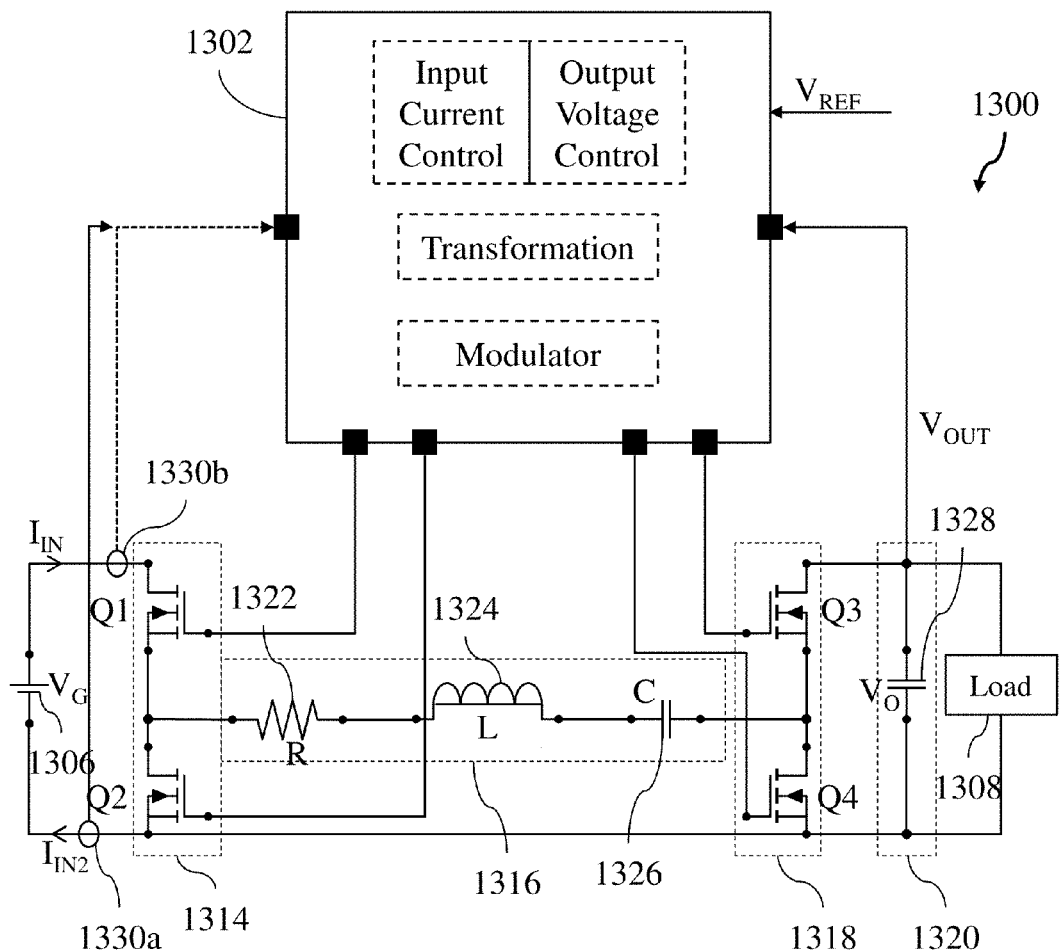
FIG. 13 illustrates a schematic diagram of a further embodiment switching converter circuit.

FIG. 13 illustrates a schematic diagram of a further embodiment switching converter circuit 1300 that includes integrated circuit (IC) 1302, which may be an integrated implementation the input current controller, output voltage controller, transformation block, and modulator as described in reference to FIG. 4. According to various embodiments, IC 1302 includes all the logic and components of these elements formed on a single IC, such as an ASIC. In other embodiments, IC 1302 may include only the control logic and the transformation logic while the modulator is implemented in a separate controller or logic block. In a further embodiment, item 1302 may depict microcontroller 1302 instead of an ASIC. In such an embodiment, the functionality of the blocks may be the same as an ASIC, but the implementation is on a microcontroller. In the various embodiments, the functionality IC or microcontroller 1302 is the same as or similar to the functionality described with reference to the individual blocks 402, 410, and 412 in FIG. 4. The various other elements in switching converter 1300 operate in a similar manner or the same as described above with reference to FIG. 4.

Figure 14:
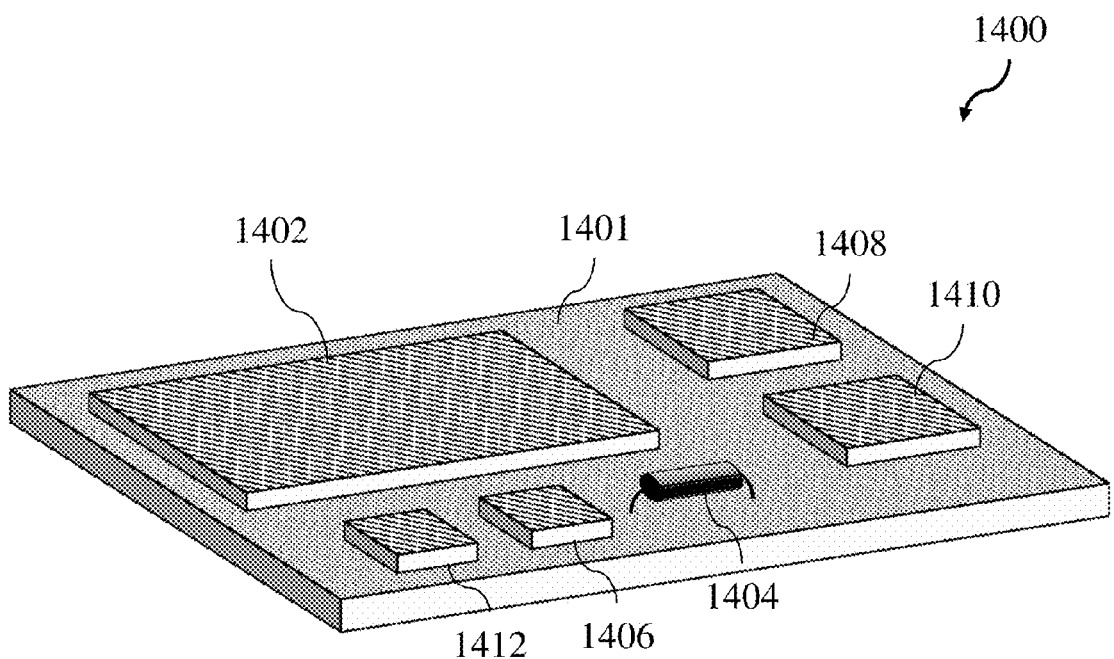
FIG. 14 illustrates a perspective view of a packaged embodiment switching converter circuit.

FIG. 14 illustrates a perspective view of a packaged embodiment switching converter circuit 1400 including a controller 1402 on a printed circuit board (PCB) 1401 with other components such as inductor 1404, capacitor 1406, and switch chip 1408. In various embodiments, controller 1402 implements the functionality as described with reference to controller 402, transformation block 410, and modulator 412 in FIG. 4. Switch chip 1408 includes switches Q1-Q4, inductor 1404 is an implementation of inductor 424, and capacitor 1406 is an implementation of capacitor 426, as described in reference to FIG. 4. In various other embodiments, controller 1402 includes switches Q1-Q4 on switch chip 1408 and/or inductor 1404 and capacitor 1406. Switch chip 1408 may include any type of electronic switches or transistor, such as MOSFETs, for example.

In some embodiments, switch driver 1410 and power supply 1412 are also included on PCB 1401. Switching converter circuit 1400 is not drawn to scale, nor is the layout of the components particularly selected. In various embodiments, PCB 1401 may have numerous other components attached thereto and all the components are organized and located based on the specific system and PCB design being implemented. Thus, one of ordinary skill in the art will recognize that the design steps in a specific implementation include a PCB layout in such embodiments, and the layout may be particularly suited to that specific implementation.

According to embodiments, a power supply controller includes an input interface, a first controller, a second controller, a transformation circuit, a switch signal generator, and an output interface. The input interface is configured to electrically receive first and second power supply measurement signals and from a switched-mode power supply. The first controller is configured to provide a first control parameter based on the first power supply measurement signal and the second controller is configured to provide a second control parameter based on the second power supply measurement signal. The transformation circuit is configured to provide a first switching control parameter that is dependent on both the first control parameter and the second control parameter. The transformation circuit is also configured to provide a second switching control parameter that is dependent on both the first control parameter and the second control parameter. The switch signal generator is configured to generate switching signals that depend on both the first switching control parameter and the second switching control parameter. The output interface is configured to electrically drive the switching signals.

In various embodiments, the first controller is configured to provide the first control parameter at least three times faster than the second controller is configured to provide the second control parameter. The first power supply measurement signal includes an output voltage of the switched-mode power supply and the second power supply measurement signal includes an input current of the switched-mode power supply. The power supply controller may further include a measurement circuit configured to measure a return current from an input port of the switched-mode power supply and to produce the second power supply measurement signal based on the return current. In some embodiments, the first switching control parameter includes a duty cycle of a first switching signal of the switching signals. Also, the second switching control parameter may include a phase shift between the first switching signal and a second switching signal of the switching signals.

In various embodiments, the first control parameter is a magnitude and the second control parameter is an angle. The magnitude and angle form polar coordinates on a plot of output power in the first and second switching control parameters. The magnitude and angle are centered at a maximum power point. Providing the first control parameter may include comparing the first power supply measurement signal with a reference voltage and determining the first control parameter based on the comparing. In some embodiments, providing the second control parameter includes decreasing the second control parameter, receiving a second power supply measurement signal a second time, comparing the second power supply measurement signal received a first time with the second power supply measurement signal received the second time, and decreasing the second control parameter again if the second power supply measurement signal received the second time decreased in comparison to the second power supply measurement signal received the first time, or increasing the second control parameter if the second power supply measurement signal received the second time increased in comparison to the second power supply measurement signal received the first time.

According to various embodiments, a method of operating a switched-mode power supply includes measuring a first electrical power supply signal of the switched-mode power supply, determining a first control parameter based on the measuring the first electrical power supply signal, measuring a second electrical power supply signal of the switched-mode power supply, determining a second control parameter based on the measuring the second electrical power supply signal, determining a first switching control parameter that is dependent on both the first control parameter and the second control parameter, determining a second switching control parameter that is dependent on both the first control parameter and the second control parameter, generating switching signals based on the first switching control parameter and the second switching control parameter, and electrically driving the switching signals at an output interface.

In various embodiments, determining the first control parameter is performed at least three times faster than determining the second control parameter. The first electrical power supply signal includes an output voltage of the switched-mode power supply and the second electrical power supply signal includes an input current of the switched-mode power supply. In some embodiments, measuring a second electrical power supply signal includes measuring a return current of an input port of the switched-mode power supply. The first switching control parameter may include a duty cycle of a first switching signal of the switching signals. The second switching control parameter may include a phase shift between the first switching signal and a second switching signal of the switching signals. The switched-mode power supply may include a first switch set including a top side switch and a bottom side switch and a second switch set including a top side switch and a bottom side switch.

In various embodiments, the first control parameter is a magnitude and the second control parameter is an angle. The magnitude and angle form polar coordinates on a plot of output power in the first and second switching control parameters and the magnitude and angle are centered at a maximum power point. In some embodiments, determining the first control parameter includes comparing the measured first electrical power supply signal with a reference voltage and determining the first control parameter based on the comparing. Determining the second control parameter includes decreasing the second control parameter, measuring the second electrical power supply signal a second time, comparing the second electrical power supply signal measured a first time with the second electrical power supply signal measured the second time, and decreasing the second control parameter again if the second electrical power supply signal measured the second time decreased in comparison to the second electrical power supply signal measured the first time, or increasing the second control parameter if the second electrical power supply signal measured the second time increased in comparison to the second electrical power supply signal measured the first time.

In various embodiments, determining the second control parameter also includes repeatedly altering the second control parameter, further measuring the second electrical power supply signal, and altering the second control parameter again based on a comparison between the further measured second electrical power supply signal and the second electrical power supply signal measured the first time. In some embodiments, the first control parameter is related to an output power of the switched-mode power supply. The second control parameter is related to an efficiency of the switched-mode power supply.

According to various embodiments, a circuit includes a switching converter configured to be coupled to a supply and to a load and a controller coupled to the switching converter and configured to supply first and second switching signals. The switching converter includes a storage circuit, a first switch configured to alternatingly conduct a current from the supply to the storage circuit based on the first switching signal, and a second switch configured to alternatingly conduct a current from the storage circuit to the load based on a second switching signal. The controller is also configured to measure the current from the supply to the storage circuit, measure a voltage output to the load, modify a duty cycle of the first switching signal and a phase shift between the first switching signal and the second switching signal based on the measured voltage output to the load, and modify the duty cycle and the phase shift based on the measured current from the supply to the storage circuit.

In various embodiments, modifying the duty cycle and the phase shift based on the measured voltage output to the load includes comparing the measured voltage output to the load with a reference voltage, altering a first intermediate control parameter by an amount proportional to a difference between the measured voltage output to the load and the reference voltage, and performing a transformation on the first intermediate control parameter in order to generate new values for the duty cycle and the phase shift based on the first intermediate control parameter. In some embodiments, modifying the duty cycle and the phase shift based on the measured current from the supply to the storage circuit includes altering a second intermediate control parameter in order to reduce the current from the supply to the storage circuit and performing a transformation on the second intermediate control parameter in order to generate new values for the duty cycle and the phase shift based on the second intermediate control parameter.

In various embodiments, the storage circuit includes an inductance and a capacitance, the first switch includes a top switch and a bottom switch, and the second switch includes a top switch and a bottom switch. In some embodiments, the storage circuit is a resonant circuit.

Advantages of various embodiments described herein may include low power consumption, fast regulation of output voltages, low sensitivity to component or power supply variation. A further advantage of some embodiments includes system implementations that do not need to determine trigonometric functions via direct calculation and/or via look-up tables.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A power supply controller comprising:
    an input interface configured to electrically receive a first power supply measurement signal and a second power supply measurement signal from a switched-mode power supply;
    a first controller configured to provide a first control parameter based on the first power supply measurement signal;
    a second controller configured to provide a second control parameter based on the second power supply measurement signal;
    a transformation circuit configured to
        generate a first switching control parameter that is dependent on both the first control parameter and the second control parameter, and
        generate a second switching control parameter that is dependent on both the first control parameter and the second control parameter;
    a switch signal generator configured to generate switching signals based on the first switching control parameter and the second switching control parameter, wherein each of the switching signals depends on both the first switching control parameter and the second switching control parameter; and
    a driver circuit configured to electrically drive the switching signals.

2. The power supply controller of claim 1, wherein the first controller is configured to provide the first control parameter at a frequency that is at least three times faster than the second controller is configured to provide the second control parameter.

3. The power supply controller of claim 1, wherein the first power supply measurement signal is an output voltage of the switched-mode power supply and the second power supply measurement signal is an input current of the switched-mode power supply.

4. The power supply controller of claim 3, further comprising a measurement circuit configured to measure a return current from an input port of the switched-mode power supply and to produce the second power supply measurement signal based on the return current.

5. The power supply controller of claim 1, wherein the first switching control parameter is comprises a duty cycle of a first switching signal of the switching signals.

6. The power supply controller of claim 5, wherein the second switching control parameter is a phase shift between the first switching signal and a second switching signal of the switching signals.

7. The power supply controller of claim 1, wherein the first control parameter is a magnitude and the second control parameter is an angle, the magnitude and angle forming polar coordinates on a plot of output power in the first and second switching control parameters, wherein the magnitude and angle are centered at a maximum power point.

8. The power supply controller of claim 1, wherein providing the first control parameter comprises comparing the first power supply measurement signal with a reference voltage and determining the first control parameter based on the comparing.

9. The power supply controller of claim 1, wherein providing the second control parameter comprises:
   decreasing the second control parameter;
   receiving a second power supply measurement signal a second time;
   comparing the second power supply measurement signal received a first time with the second power supply measurement signal received the second time; and
   decreasing the second control parameter again if the second power supply measurement signal received the second time decreased in comparison to the second power supply measurement signal received the first time, or increasing the second control parameter if the second power supply measurement signal received the second time increased in comparison to the second power supply measurement signal received the first time.

10. The power supply controller of claim 1, wherein the power supply controller is disposed on an integrated circuit.

11. A method of operating a switched-mode power supply, the method comprising:
   measuring a first electrical power supply signal of the switched-mode power supply;
   determining a first control parameter based on the measuring the first electrical power supply signal;
   measuring a second electrical power supply signal of the switched-mode power supply;
   determining a second control parameter based on the measuring the second electrical power supply signal;
   generating a first switching control parameter that is dependent on both the first control parameter and the second control parameter;
   generating a second switching control parameter that is dependent on both the first control parameter and the second control parameter;
   generating switching signals based on the first switching control parameter and the second switching control parameter, wherein each of the switching signals depends on both the first switching control parameter and the second switching control parameter; and
   electrically driving the switching signals using a driver circuit.

12. The method of claim 11, wherein determining the first control parameter is performed at a frequency that is at least three times faster than a frequency at which determining the second control parameter is performed.

13. The method of claim 12, wherein the first electrical power supply signal is an output voltage of the switched-mode power supply and the second electrical power supply signal is an input current of the switched-mode power supply.

14. The method of claim 13, wherein measuring a second electrical power supply signal comprises measuring a return current of an input port of the switched-mode power supply.

15. The method of claim 13, wherein the first switching control parameter is a duty cycle of a first switching signal of the switching signals.

16. The method of claim 15, wherein the second switching control parameter is a phase shift between the first switching signal and a second switching signal of the switching signals.

17. The method of claim 16, wherein the switched-mode power supply comprises a first switch set including a top side switch and a bottom side switch and a second switch set including a top side switch and a bottom side switch.

18. The method of claim 17, wherein the first control parameter is a magnitude and the second control parameter is an angle, the magnitude and angle forming polar coordinates on a plot of output power in the first and second switching control parameters, wherein the magnitude and angle are centered at a maximum power point.

19. The method of claim 13, wherein determining the first control parameter comprises comparing the measured first electrical power supply signal with a reference voltage and determining the first control parameter based on the comparing.

20. The method of claim 19, wherein determining the second control parameter comprises:
   decreasing the second control parameter;
   measuring the second electrical power supply signal a second time;
   comparing the second electrical power supply signal measured a first time with the second electrical power supply signal measured the second time; and
   decreasing the second control parameter again if the second electrical power supply signal measured the second time decreased in comparison to the second electrical power supply signal measured the first time, or increasing the second control parameter if the second electrical power supply signal measured the second time increased in comparison to the second electrical power supply signal measured the first time.

21. The method of claim 20, wherein determining the second control parameter further comprises repeatedly altering the second control parameter, further measuring the second electrical power supply signal, and altering the second control parameter again based on a comparison between the further measured second electrical power supply signal and the second electrical power supply signal measured the first time.

22. The method of claim 11, wherein the first control parameter is related to an output power of the switched-mode power supply.

23. The method of claim 11, wherein the second control parameter is related to an efficiency of the switched-mode power supply.

24. A circuit comprising:
   a switching converter configured to be coupled to a supply and to a load, the switching converter comprising:
      a storage circuit,
      a first switch configured to alternatingly conduct a current from the supply to the storage circuit based on a first switching signal, and
      a second switch configured to alternatingly conduct a current from the storage circuit to the load based on a second switching signal; and a controller coupled to the switching converter and configured to supply the first and second switching signals, wherein the controller is configured to:
  measure the current from the supply to the storage circuit,
  measure a voltage output to the load,
  modify a duty cycle of the first switching signal and a phase shift between the first switching signal and the second switching signal based on the measured voltage output to the load, and
  modify the duty cycle and the phase shift based on the measured current from the supply to the storage circuit.

25. The circuit of claim 24, wherein modifying the duty cycle and the phase shift based on the measured voltage output to the load comprises:
  comparing the measured voltage output to the load with a reference voltage;
  altering a first intermediate control parameter by an amount proportional to a difference between the measured voltage output to the load and the reference voltage; and
  performing a transformation on the first intermediate control parameter in order to generate new values for the duty cycle and the phase shift based on the first intermediate control parameter.

26. The circuit of claim 25, wherein modifying the duty cycle and the phase shift based on the measured current from the supply to the storage circuit comprises:
  altering a second intermediate control parameter in order to reduce the current from the supply to the storage circuit; and
  performing a transformation on the second intermediate control parameter in order to generate new values for the duty cycle and the phase shift based on the second intermediate control parameter.

27. The circuit of claim 26, wherein the storage circuit comprises an inductance and a capacitance; the first switch comprises a top switch and a bottom switch; and the second switch comprises a top switch and a bottom switch.

28. The circuit of claim 24, wherein the storage circuit is a resonant circuit.

* * * * *

UNITED STATES PATENT AND TRADEMARK OFFICE
CERTIFICATE OF CORRECTION

PATENT NO. : 9,490,719 B2  
APPLICATION NO. : 14/133129  
DATED : November 8, 2016  
INVENTOR(S) : Luca Scandola Page 1 of 1

It is certified that error appears in the above-identified patent and that said Letters Patent is hereby corrected as shown below:

In the Claims

In Column 14, Line 66, Claim 5, delete "comprises".

Signed and Sealed this  
Third Day of October, 2017

Joseph Matal  
*Performing the Functions and Duties of the*  
*Under Secretary of Commerce for Intellectual Property and*  
*Director of the United States Patent and Trademark Office*